US010433017B2

United States Patent
Brown

(10) Patent No.: US 10,433,017 B2
(45) Date of Patent: Oct. 1, 2019

(54) SYSTEMS AND METHODS FOR INTEGRATED HTML5 SEARCHING AND CONTENT DELIVERY

(71) Applicant: CABLE TELEVISION LABORATORIES, INC, Louisville, CO (US)

(72) Inventor: Ralph William Brown, Boulder, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 93 days.

(21) Appl. No.: 15/671,354

(22) Filed: Aug. 8, 2017

(65) Prior Publication Data

US 2018/0041812 A1    Feb. 8, 2018

Related U.S. Application Data

(60) Provisional application No. 62/372,292, filed on Aug. 8, 2016.

(51) Int. Cl.
*H04N 21/482* (2011.01)
*H04N 21/61* (2011.01)
(Continued)

(52) U.S. Cl.
CPC ....... *H04N 21/482* (2013.01); *H04L 65/4084* (2013.01); *H04N 21/26613* (2013.01); *H04N 21/6125* (2013.01); *H04L 65/1073* (2013.01); *H04L 67/20* (2013.01); *H04L 67/42* (2013.01); *H04N 21/40* (2013.01)

(58) Field of Classification Search
CPC ............. H04N 21/26613; H04N 21/40; H04N 21/482; H04N 21/6125; H04L 65/1073; H04L 65/4084; H04L 67/20; H04L 67/42
See application file for complete search history.

(56) References Cited

U.S. PATENT DOCUMENTS

2006/0098824 A1* 5/2006 Mao ...................... H04L 9/3073
380/282
2016/0349949 A1* 12/2016 Miller ................... G06F 3/0482
(Continued)

OTHER PUBLICATIONS

Huff et al, "Online Multimedia Authorization Protocol", Aug. 22, 2012, Open Authentication Technical Committee, vol. 1 (Year: 2012).*

*Primary Examiner* — Nicholas T Corbo
(74) *Attorney, Agent, or Firm* — Armstrong Teasdale LLP

(57) ABSTRACT

A system for managing content distributed over an electronic network includes a multichannel video programming distributor server for distributing and managing content, and an authorization server for establishing and managing permissions for subscriber access to the content. Each of the servers are in operable communication with the electronic network. The system further includes at least one subscriber device in operable communication with the electronic network. The subscriber device includes a processor, a device memory, and a display, and also an MVPD application stored within the device memory and configured to run on the processor when executed. The MVPD application is configured to display for viewing, upon invocation of a deep link within the MVPD application, content from the multichannel video programming distributor server.

24 Claims, 5 Drawing Sheets

(51) Int. Cl.
H04N 21/266 (2011.01)
H04L 29/06 (2006.01)
H04N 21/40 (2011.01)
H04L 29/08 (2006.01)

(56) References Cited

U.S. PATENT DOCUMENTS

2017/0041151 A1* 2/2017 Kommireddy .......... H04L 9/006
2017/0078721 A1* 3/2017 Brockmann ....... H04N 21/8456
2017/0078737 A1* 3/2017 Jagt ..................... H04N 21/439

* cited by examiner

SYSTEMS AND METHODS FOR INTEGRATED HTML5 SEARCHING AND CONTENT DELIVERY

CROSS REFERENCE TO RELATED APPLICATIONS

This application claims the benefit of and priority to U.S. Provisional Patent Application Ser. No. 62/372,292, filed Aug. 8, 2016, which is incorporated herein by reference in its entirety.

BACKGROUND

The field of the disclosure relates generally to management of linear media over electronic networks, and more particularly, to management and control of integrated search and delivery of linear content across linear and non-linear platforms.

A Multichannel Video Programming Distributor (MVPD) is a content provider or service provider, such as a cable operator, that delivers video programming services over one or more channels, typically under a subscription agreement with a subscriber or client. Subscribers may typically view available programming services on a user interface (UI), which may include a display device operating with an interactive browser. Conventional browsers utilize Hypertext Markup Language (HTML) for the structure, organization, and content of the browser display. Recently though, HTML5 is being more widely utilized as a substitute for older HTML protocols. HTML5 is a bundled hybrid of HTML, cascading style sheets (CSS), and JavaScript, and the bundled hybrid has proven more agile than HTML, more usable by mobile devices, and more compatible across different browsers, particularly for cross-platform application development, such as linear video streaming.

Growing use of HTML5, however, has created difficulties for MVPD content providers. The increasing versatility of HTML5 has blurred the line between linear and non-linear media applications, which were once defined by the ability to interact with the delivered content. Initially, linear television channels that offer video programs on specific channels, at specific times of day, were considered linear content, whereas video-on-demand (VoD) services were considered non-linear, or "over the top," content. Today though, a digitally streaming movie that was once considered to be linear content, may now also be non-linear due to the addition of DVD and DVR formats allows that provide a user the ability to select scenes within the movie and move both forward and backward within the content.

The advent of HTML5 has blurred these linear/non-linear content lines even further. Under older HTML coding, streaming content was experienced on a device or application configured to receive and experience the content as intended by the MVPD. The cross-platform capabilities of HTML5 though, allow linear content configured for one type of device to be experienced on a different type of device for which the content was not configured. In one example, cable television subscribers may experience their cable linear content on a device that is not in communication with their cable set top box (STB), such as a smartphone, table, or laptop computer (typically in cooperation with an MVPD application loaded on the particular non-MVPD device). In some instances, these non-MVPD devices, either directly or through competing applications loaded on the device, are capable of altering or interrupting the linear content in a way that is not intended or desired by the MVPD.

Conventional MVPDs control most of the viewing experience, including information a viewer receives about programming, opportunities to view or purchase on-demand programming, and information about adding premium channels. Recent FCC proposals utilize HTML5 to "unlock" the STB to permit non-MVPD entities to control various aspects of the viewing experience. For example, it has been noted that, under the proposed scheme, a third-party STB could potentially run on Android, while opportunities to purchase on-demand programming could be driven through the Google Play Store. In this example, the linear content from the STB is not significantly affected.

In another example, however, an MVPD may deliver a telecast of a sporting event as linear content, along with paid commercial advertisements. A viewer or subscriber of the telecast may experience both the sports telecast itself, as well as any paid commercial advertisements that are provided with the linear content. A non-MVPD device, however, may be configured such that a third party server or operator of the non-MVPD device might add or substitute its own commercial advertising throughout the linear sports telecast. The viewer might see only the sports telecast, but not the commercials attached thereto. Such additions or substitutions could negatively affect the revenue and contractual agreements made by the MVPD with its advertisers.

Accordingly, it is desirable for an MVPD to allow its subscribers to experience the linear content through non-MVPD devices, but without permitting alteration or interruption of the linear content by the non-MVPD device.

BRIEF SUMMARY

In an aspect, a system for managing content distributed over an electronic network includes a multichannel video programming distributor server for distributing and managing content, and an authorization server for establishing and managing permissions for subscriber access to the content. Each of the servers are in operable communication with the electronic network. The system further includes at least one subscriber device in operable communication with the electronic network. The subscriber device includes a processor, a device memory, and a display, and also an MVPD application stored within the device memory and configured to run on the processor when executed. The MVPD application is configured to display for viewing, upon invocation of a deep link within a window created on the display by the MVPD application, content from the multichannel video programming distributor server.

In another aspect, a method for authenticating and authorizing at least one user agent to access content selected through an MVPD HTML5 application of a multichannel video programming distributor is provided. The method includes steps of verifying that the MVPD HTML5 application is accessing the selected content on behalf of a registered subscriber of the multichannel video programming distributor, deep linking to MVPD HTML5 application by selecting a unique URL within a user interface of an electronic device in which the MVPD HTML5 application is stored, authorizing the registered subscriber based on the particular entitlements of the registered subscriber with the multichannel video programming distributor, executing a lightweight license between the at least one user agent and the multichannel video programming distributor, validating the licensor as a legitimate business entity, downloading a certificate a testing that the lightweight license has been executed, the certificate including at least a public key and a private key pair, and installing the private key from the public key and private key pair on the electronic device.

In yet another aspect, a method for accessing content from a multichannel video programming distributor over an electronic network by a user agent is provided. The method includes a step of causing an HTML5-based application to be executed on an electronic device of the user agent. The HTML5-based application is authorized by the multichannel video programming distributor. The method further includes steps of generating a first URL to access the content, instructing the HTML5-based application to open at least one of a browser window and a user agent context on a user interface of the electronic device, loading an inline frame within the at least one of the browser window and the user agent context, discovering a web crypto key pair of the user agent, obtaining a signed token from an authorization provider using a private key of the discovered key pair, verifying the signed token using a public key of the discovered key pair, requesting a user interface page from the multichannel video programming distributor, and transmitting a user interface page that sets an authentication cookie on the electronic device.

In a still further aspect, a method for accessing content from a multichannel video programming distributor over an electronic network by an electronic viewing device is provided. The electronic viewing device includes at least one processor and a memory. The electronic network includes at least one client server in operable communication therewith. The method includes a step of causing an HTML5-based application to be executed on the electronic viewing device. The HTML5-based application is authorized by the multichannel video programming distributor. The method also includes a step of invoking a client application on the electronic viewing device. The client application includes a ClientID. The method further includes a step of activating a deep link on a user interface of the electronic viewing device to request content access from the multichannel video programming distributor. The deep link includes at least one unique URL referencing both the content and the multichannel video programming distributor. The method still further includes steps of redirecting the electronic device to contact an authorization server to look up the ClientID, redirecting the HTML5-based application to access a redirect URI from the client/server, requesting a request from the authorization server for an authorization grant, returning an authorization token to one of the client server and the electronic viewing device, and validating the access token to allow access to the content by the electronic viewing device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments herein describe and illustrate a secure MVPD HTML5 content search, delivery, and management system to more reliably guarantee that linear content from an MVPD is experienced on non-MVPD devices without alteration or interruption.

Figure 1:
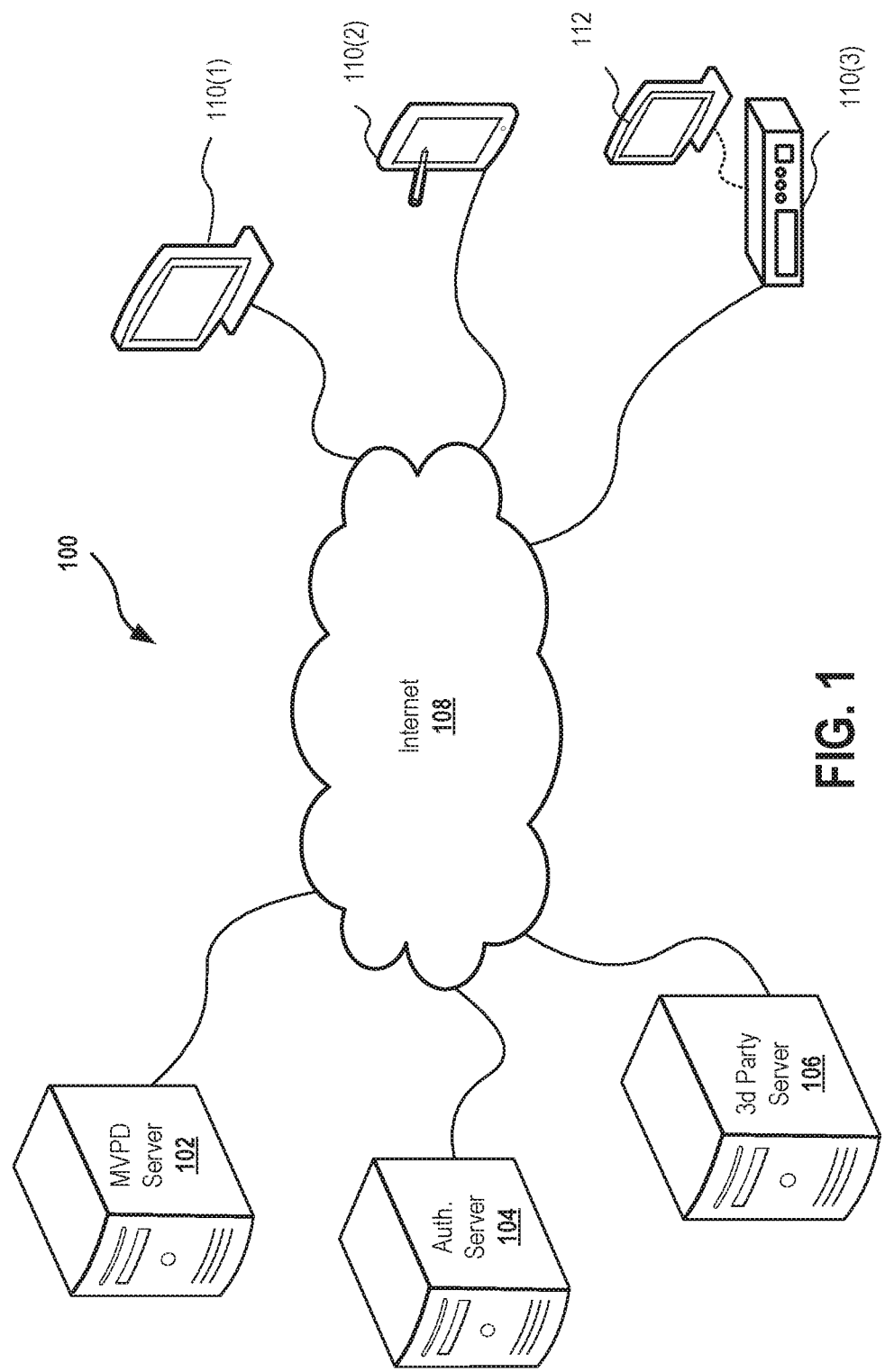
FIG. 1 is a schematic illustration of an MVPD content and delivery system, according to an embodiment.

FIG. 1 is a schematic illustration of an MVPD content and delivery system 100. System 100 includes an MVPD server 102, an authorization server 104, and a third party server 106. Each of servers 102, 104, and 106 is in operable communication with Internet 108 (or similarly capable electronic network). System 100 further includes one or more subscriber devices 110, each of which is also in operable communication with Internet 108. Subscriber devices 110 include, without limitation, laptop or desktop computer 110(1), smartphone or tablet 110(2), and set top box 110(3) having a separate display 112. For simplicity of explanation, one of ordinary skill in the art will understand that all of these elements of system 100 represent various electronic devices, computer systems, and/or software applications communicating over electronic network (cable, wired, and or wireless, etc.), and do not reference to natural persons.

MVPD HTML5 Application and Interfaces

In an exemplary embodiment, each of subscriber devices 110 includes in a memory therein (not shown) an MVPD HTML5 application having integrated search and management capabilities according to the embodiments described herein. When executed, the MVPD HTML5 application provides three information flows—(i) Service Discovery, (ii) Entitlement Information, and (iii) Content Delivery—that have been identified in a recent FCC Notice of Proposed Rulemaking (NPRM). Each of these three information flows may be provided through hardware or software interfaces (not separately shown).

In the exemplary embodiment, a Service Discovery interface includes one or more specific interfaces, such as (a) a channel line-up for linear content (e.g., CableCARD), and (b) a list of available VoD titles for VoD content. In some embodiments, descriptive metadata for the particular content is obtained from commercial sources. In at least one embodiment, an Entitlement Information interface is then established by providing a subset of the Service Discovery information to which a particular subscriber is entitled, that is, the channel list and the VoD titles to which the subscriber is subscribed.

In the exemplary embodiment, a Content Delivery interface is provided according to a deep link into the MVPD HTML5 application, as explained in more detail below. This novel deep link may be specific to the content identified by the UI through which the identified content is selected.

Deep Linking

According to an exemplary embodiment, access to MVPD content is performed by invoking, that is, deep linking into, the MVPD HTML5 app to play requested linear or VoD content. Through use of the deep linking systems and methods described herein, third parties are unable to access the MVPD content other than through the MVPD HTML5 application. The deep link effectively allows the MVPD application to invoke parental control over the access to content, and prevent alteration or interruption (other than DVR pause, rewind, and forward controls) thereof.

In some embodiments, the deep linking embodiments described herein are not limited to linear or VoD content, and may be implemented with other forms of content, including without limitation DVR recordings, start-overs, playbacks from local or cloud storage, etc. In these embodiments, the MVPD provides a deep link to a landing page that offers these additional capabilities. In at least some embodiments, where a third party content reference includes multiple options (e.g., all episodes for "Season 1" of a TV series) the MVPD provides a landing page to allow the user or subscriber to navigate these options. In an exemplary embodiment, the deep link thus serves to function as a handoff from the third party UI to the MVPD navigation if abilities. In at least one example, a request to for "ALL" MVPD linear content (e.g., "*.*") would direct the user/subscriber to the MVPD application's electronic programming guide (EPG). Similarly, a request for "ALL" MVPD VoD content would direct the requestor to the MVPD application's VoD navigation.

In at least one embodiment, system 100 is configured to perform integrated linear content searching through an interface such as CableCARD. In such instances EPG metadata, including descriptive metadata and program schedule information, may be obtained from commercial providers (e.g., RoVi, Gracenote, etc.). Providers of descriptive metadata are consistent with one another regarding program titles or other descriptive metadata, and character strings used to identify specific titles or other metadata can vary between providers. The MVPD is not obligated to resolve such differences, and will provide the program title obtained from commercial metadata. As explained further below, systems and methods according to the present embodiments are able to better accommodate and/or normalize such provider differences.

In an exemplary embodiment, the MVPD (e.g., through MVPD server 102) provides a channel line-up relevant for the specific subscriber device 110 (e.g., SCTE 65 data), along with the ability to select content by channel number through the subscriber UI. In an exemplary embodiment, MVPD server 102 is configured to identify a subscriber either prior to the search commencement, or during the search process, by subscriber device 110. In an alternative embodiment, the subscriber is identified, along with the subscriber's subscriptions to services, when subscriber device 110 is setup. In some embodiments, subscriber and subscription identification occurs when a search result generates matches across accessible content sources. Once a match occurs, subscriber authentication may be performed (described further below) when an attempt is made to access the content through the generated matches.

In the exemplary embodiment, deep links into the MVPD HTML5 application utilize unique Uniform Resource Locators (URLs). One such unique URL could be, for example, https://www.<mvpd>.com/linearTV_channel_lineup, where "<mvpd>" represents a domain name of the MVPD or MVPD server 102. In an embodiment, accessing this unique URL returns a list of channel numbers with short name identifiers (e.g., SCTE 65). As another example, another unique URL could be https://www.<mvpd>.com/linearTV?channel=<channel_number>, which may represent content currently airing on a specified channel number from the channel list.

Similar to the embodiments described above, VoD descriptive metadata may also be available through commercial providers (e.g., IMDb). However, specific VoD content that is available from one particular MVPD may not be commercially available from a source independent of that MVPD. In such instances, systems and methods according to the present embodiments are further configured to allow the MVPD search capability for the VoD content that is relevant to the specific subscriber device 110. In this example, additional unique URLs are utilized to deep link into the MVPD HTML5 application. For example, and without limitation, a unique URL such as https://www.<mvpd>.com/vod_listing, could be utilized to return a list of VoD titles. From this returned list of program titles, specific VoD content may be searched for and accessed, as well as relevant descriptive metadata obtained from commercial providers. Further, https://www.<mvpd>.com/vod?program=<program_name> may be, for example, another unique URL used to access the particular VoD content selected from the returned list of titles through a landing page corresponding to the program name that was provided by the MVPD (e.g., MVPD server 102) in response to the VoD listing request.

DVR Functionality for Linear Content

In conventional systems, the FCC only requires that third parties are able to access (watch) linear content that is currently airing, and also access (play) VoD content. DVR functionality, such as the ability to pause linear content, record linear content (either locally or in the cloud), and/or to fast-forward/rewind buffered or recorded content is not presently legally required, but such functionality is widely used in the current marketplace, and widely desired by subscribers/users.

Local DVR recordings typically require a bilateral agreement between the MVPD and the user beyond a lightweight agreement to address local storage issues, such as the amount of local storage available (e.g., on subscriber device 110), the persistence of data written to the local storage, restrictions on access to the stored content, etc. Systems and methods according to the present embodiments though, advantageously access MVPD content through the MVPD HTML5 application. That is, in an exemplary embodiment, DVR functions of pause, rewind, and fast-forward are implemented by the MVPD HTML5 application itself, thereby eliminating the need for additional interfaces between a user and the MVPD HTML5 application.

In the exemplary embodiment, a DVR recording is scheduled, for example, by the UI or initiated while viewing linear content, e.g., by activating the record (REC) button on a remote control device. According to the present systems and methods, all content access is through the MVPD HTML5 application. Thus, when a recording is initiated while viewing linear content, the UI/content interaction is through the MVPD HTML5 application. Accordingly, under the scenario, the MVPD HTML5 is configured to itself provide and/or implement the recording functionality.

In the exemplary embodiment, scheduled DVR recordings are executed by communicating to the MVPD HTML5 application the specific program to be recorded, such as by the program name with the date and time of recording, or by the channel number with the date/time. In an alternative embodiment, scheduled recordings can be performed similarly to those done utilizing conventional CableCARD interfaces. That is, at a scheduled time, a third party device accesses the selected channel that carries program to be recorded and records the selection until the program is completed. According to the present systems and methods though, the MVPD HTML5 application is further configured to include parameters to the channel access to indicate that the MVPD HTML5 application should perform its own record function, and for a particular duration. In an embodiment, the resultant DVR recording is stored either locally or in the cloud, under the control of the MVPD HTML5 application.

In the exemplary embodiment, the MVPD HTML5 application is also configured to control local recording and playback functionality. Local recording and playback is, for example, implemented by the MVPD HTML5 application by writing video segments onto local web user agent (UA) storage. In an embodiment, the MVPD HTML5 application is configured to play back the video segments by reading back the video segments from local storage by playing them utilizing one or more Media Source Extensions (MSEs) and/or Encrypted Media Extensions (EMEs). In the exemplary embodiment, data stored in the local web UA storage is associated with a first application, MPVD, and webpage, and is not available outside that particular application, MPVD, and webpage combination. In some embodiments, the MVPD HTML5 application described herein is configured such that local web UA storage in one application is not available to any application other than the MVPD HTML5 application.

According to the embodiments herein, navigation and playback of DVR recordings may be performed by either the MVPD HTML5 application itself or the separate UI, but the recording functions themselves are performed by the MVPD HTML5 application, as described above.

In an embodiment, the unique URL for accessing linear content (one example described above) is extended to support both the scheduled (e.g., record=now and duration=duration parameters) and user-initiated (e.g., record=user_initiated parameter) DVR recording use cases. The unique URL thus may be, for example, https://www.<mvpd>.com/linearTV?channel=<channel_number>&record=<now|user_initiated>&duration= <duration>.

In some embodiments, the MVPD HTML5 application is further configured to enable navigation of DVR recorded content (either local or cloud recordings) by the UI by permitting the UI to have visibility into the DVR recordings that the MVPD HTML5 application has created/stored. The UI will then, according to the embodiments herein, invoke the MVPD HTML5 application itself to play or delete a specific DVR recording. That is, the MVPD HTML5 application controls the play and delete functionality of the DVR recordings, and not the particular subscriber device 110.

In an exemplary embodiment, MVPD HTML5 application control is further established by the creation of a unique identifier for each DVR recording created by the MVPD HTML5 application. The respective UI, when accessing a particular recording, will then use the unique identifier particular to the access content to invoke the MVPD HTML5 application and either play/delete the corresponding DVR recording. In some embodiments, the unique identifier alone may not be sufficient to enable the UI to navigate the DVR content. In such instances, the MVPD HTML5 application is further configured to associate the unique identifier with the channel, time, and duration of the recording, thereby enabling the UI to associate the selected recording with a specific program.

In some embodiments, the MVPD HTML5 application is further configured to enable user navigation of DVR recorded content utilizing the unique identifier, along with the relevant channel number, start time, and program duration, as a reference to the user's own EPG metadata to provide navigation information accessible by the user's UI for playback. In such examples, the user implements an associated deep link to invoke the MVPD HTML5 application to playback the recorded content, thereby passing the recording ID to identify the specific recorded content.

In some instances, a user may find it necessary to delete recordings (e.g., through the UI) to make space available for new recordings, such as when there may be limited recording space availability. In these instances, the MVPD HTML5 application is configured to provide a new set of one or more unique URLs to enable user navigation of DVR recorded content. One such exemplary unique URL may be, https://www.<mvpd>.com/dvr_listing, which would be invoked to return a list including, without limitation, recording_id, channel_number, start_date_time, and program duration. Similarly, A unique URL may also be provided to play or delete the DVR recording specified by its recording ID. One example of such a unique URL is https://www.<mvpd>.com/dvr?id=recording_id&action<play|delete>.

According to the embodiments described herein, the advantageous MVPD HTML5 application is thus capable of supporting multiple and concurrent DVR recordings, including a real time recording of a linear channel being currently viewed (e.g., where a subscriber has initiated the DVR recording while watching linear TV). In some embodiments, concurrent DVR recordings are managed utilizing multithreading. At least one example, the MVPD HTML5 application opens multiple tabs on the UI, where each tab is runs its own single threaded context. Thus, each DVR recording that would be executed by its own instance of the MVPD HTML5 application would instead run in its own separate context under this scenario.

Figure 2:
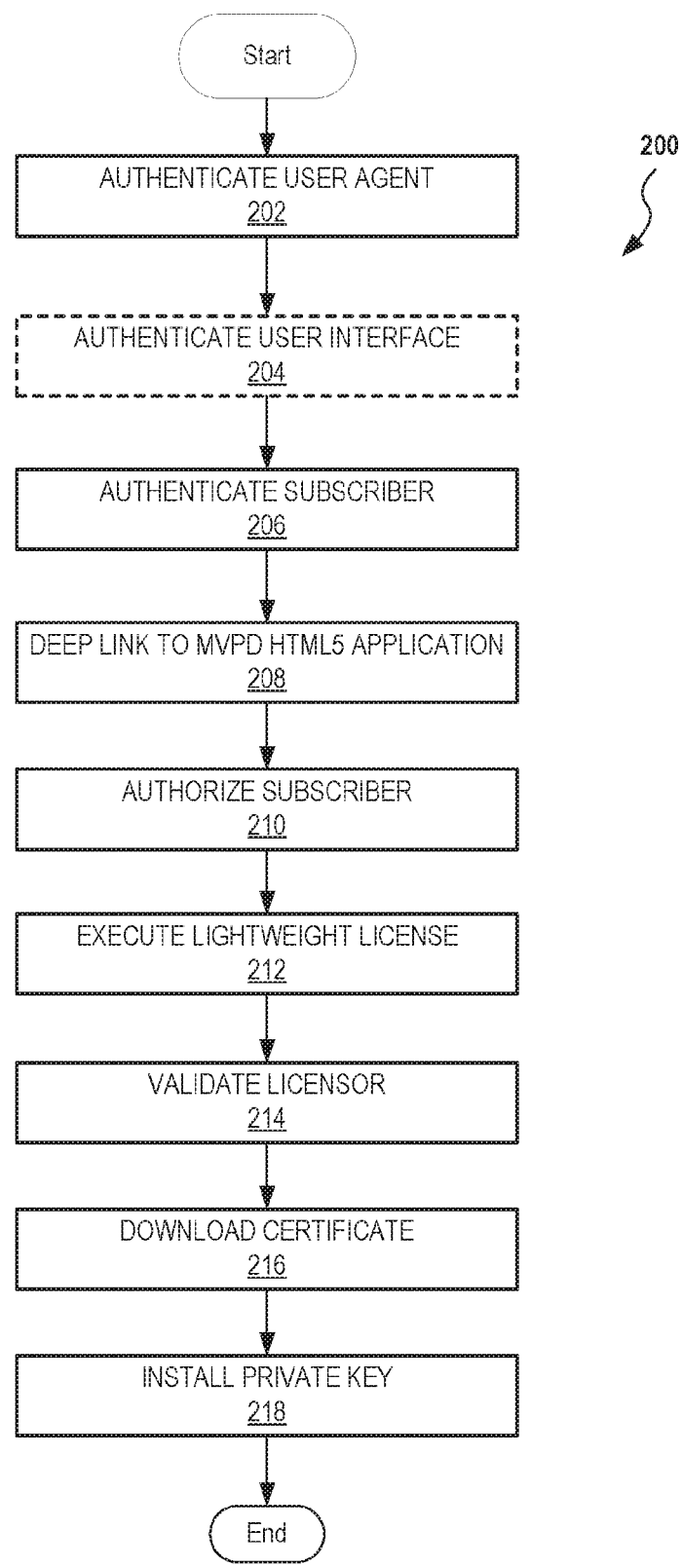
FIG. 2 is a flow chart diagram of an exemplary authentication and authorization process implemented with the embodiments herein.

Authentication and Authorization:

FIG. 2 is a flow chart diagram of an exemplary authentication and authorization process 200 that may be implemented with one or more of the embodiments herein. Process 200 serves to verify that a particular user and device (e.g., subscriber device 110, FIG. 1) are authorized to access particular content selected or invoked through the MVPD HTML5 application.

Generally, lightweight license terms will cover the compliance requirements of both the HTML5 UA itself (e.g., to implement MSE/EME/WebCrypto specifications, keep current with World Wide Web Consortium (W3C) standards, etc.), as well as and the third-party UI application behavior (e.g., to protect consumer privacy, channel line-up, advertising, etc.). Consequently, both of the HTML5 UA and UI must be validated as coming from an entity that has executed the relevant lightweight license. The UI will typically solicit from the associated user the user's preferred MVPD so that a subscriber may access the MVPD service to which the user is subscribed. After the MVPD service has been accessed, and the HTML5 UA and UI have been validated, the subscriber must then be authenticated (e.g., as being in good standing with the selected MVPD). The MVPD (e.g. MVPD server 102, FIG. 1) can then use the subscriber's entitlements (subscription) to authorize access (e.g., by authorization server 104, FIG. 1) for the subscriber to the entitled content (e.g., through subscriber device 110, FIG. 1).

Process 200 begins at step 202. In step 202, the HTML5 UA is authenticated as a compliant implementation, and as being from an authentication entity having executed the lightweight MVPD license. In one embodiment, a certificate (or other key material) is issued (e.g., by authorization server 104, FIG. 1) to the accessing device (e.g., subscriber device 110, FIG. 1) upon execution of the lightweight MVPD license. This certificate may then be asserted by the subscriber device when accessing the MVPD HTML5 application. In an alternative embodiment, a certificate or other suitable key material is required only for UA authentication through a WebCrypto key discovery Application Programming Interface (API). After the UA is authenticated, process 200 proceeds to step 204.

Step 204 is an optional step. In step 204, the UI is authenticated to determine or otherwise confirm that the UI itself is from an entity having executed the lightweight MVPD license. In some embodiments, the UI does not require separate authentication.

In step 206, process 200 authenticates the subscriber. That is, process 200 verifies that the subscriber is a paying (or otherwise authorized) subscriber of the MVPD. In an exemplary embodiment, a subscriber registration subprocess is invoked in step 206 to associate the subscriber device 110 and or the MVPD HTML5 application with an account the user has established with the MVPD. In one example of step 206, the subscriber registration subprocess provides the opportunity to both authenticate the subscriber and to assert MVPD limitations, for example, number of subscriber devices that are authorized to access the MVPD server, etc.

In some embodiments, the subscriber registration subprocess issues a security certificate to the subscriber device, and/or to the MVPD HTML5 application therein. If or when the subscriber terminates the associated account, this security certificate may be revoked or otherwise flagged as out of compliance. In at least one embodiment, where no web API exists that allows a certificate to be installed in the UA on behalf of the user, a different authorization framework, such as Open Authorization (OAuth), may be utilized. Alternatively, or additionally, session cookies are utilized in the authorization subprocess. In one embodiment, third party server 106 is configured to provide a service, e.g., similar to the MSE specification, that allows subscribers to pre-authenticate with a particular MVPD, such that the MVPD subscriber authentication occurs automatically. Once the subscriber is authenticated, process 200 proceeds to step 208.

In step 208, the subscriber selects program content to experience through the UI, and deep links to the MVPD HTML5 application to view a linear channel or a VoD title, and process 200 then proceeds to step 210. In step 210, the subscriber is authorized to access the content based on the subscriber's particular entitlements with the respective MVPD. Because subscriber entitlements may change over time, the subscriber authentication performed in step 206 does not necessarily serve to describe the current entitlements of the subscriber at the time of access. The subscriber certificate obtained in step 206 though, will nevertheless attest to the identity of the subscriber, and the certificate may for further be used to automatically or rapidly determine the subscriber's authorization to view content. In some embodiments, WebCrypto or OAuth are utilized to facilitate subscriber authorization. After the subscriber is authorized to view content, process 200 proceeds to step 212.

In step 212, a lightweight license is executed to access the MVPD HTML5 application and selected content. The lightweight license provides a minimum set of terms necessary to support the MVPD HTML5 application usage. In one embodiment, the lightweight license is executed with each MVPD individually. In another embodiment, the lightweight license is executed through an industry-wide license to which all MVPDs within the system have agreed. Upon commencement of the lightweight license execution, process 200 proceeds to step 214.

In step 214, process 200 validates the licensor of the lightweight license. In the exemplary embodiment, a user accesses the website of the MVPD (or a website that hosts the license on behalf of the MVPD), and executes the lightweight license under a conventional framework, such as through an automated click-through license agreement. The accessed website then becomes the authentication domain used in the HTML5 UA authentication subprocess, described below. In this example, once the authentication domain is accessed, a validation subprocess is performed to validate the licensor represents a legitimate entity (e.g., not a hacker). In some embodiments, the validation subprocess includes a validation of the email domain of the licensor and or a company lookup. Once the licensor is validated, process 200 proceeds to step 216.

In step 216, the user obtains a certificate attesting to execution of the lightweight license. In the exemplary embodiment, the certificate is obtained by receiving an email with a link to download the certificate containing a public/private key pair confirming the agreement. In some embodiments, the lightweight license includes obligations to protect the private key of the certificate. Once the certificate is downloaded, process 200 proceeds to step 218. In step 218, the private key from the certificate is installed into the HTML5 UA. In the exemplary embodiment, the certificate is installed utilizing a well-known name (e.g., "<MVPD>-Auth") to enable more easy discovery and use by the authentication process. The authentication provider domain used in process 200 is thus an individual MVPD's domain, e.g., where a license is executed with each MVPD individually, or the domain of the industry-wide hosting site, e.g., where a license is executed only once for all related MVPDs.

As described further below, process 200 serves to verify that the HTML5 UA is from an entity that has executed the lightweight license. The authentication and authorization confirmed by process 200 is then implemented to securely access content from the MVPD, while preventing alteration and/or undesirable interruption (e.g., non-DVR functionality) to the accessed content. Exemplary implementation utilizing Web Crypto APIs and OAuth are described below.

Web Crypto Application Programming Interfaces (APIs)

Figure 3:
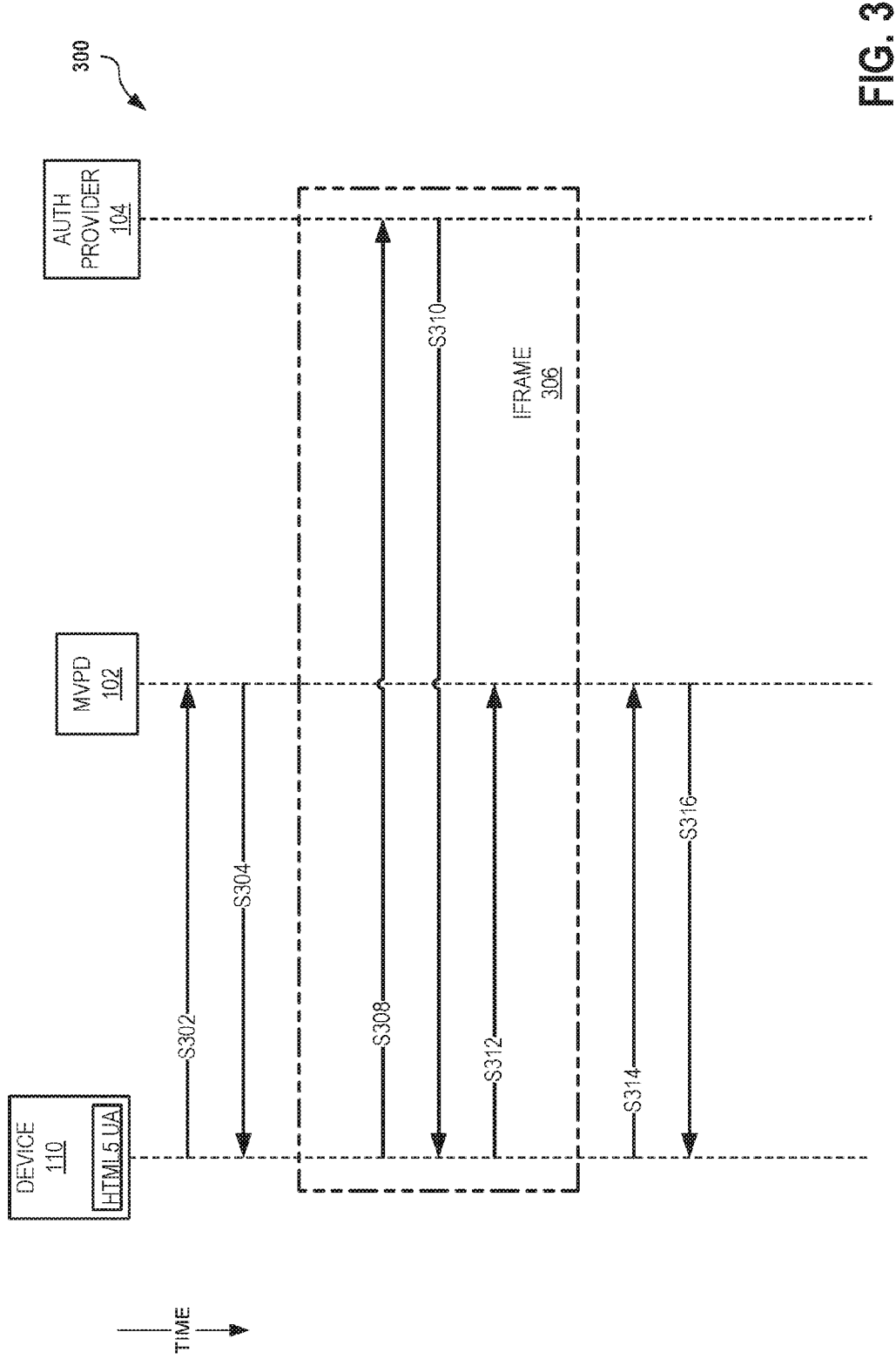
FIG. 3 is a sequence diagram for an exemplary linear content process that may be implemented utilizing a web crypto application programming interface, according to an embodiment.

Web Crypto API is an interface allowing a script to use cryptographic primitives in order to build systems using cryptography. In the exemplary embodiment, the HTML5 UA implements Web Crypto with import/export support of JavaScript Object Notation (JSON) Web Keys (JWKs), which are data structures representing cryptographic keys):

FIG. 3 is a sequence diagram for an exemplary linear content process 300 which may be implemented utilizing a Web Crypto application programming interface. In the exemplary embodiment, process 300 is implemented utilizing one or more of the elements of system 100, FIG. 1, described above. That is, process 300 is implemented with respect to an MVPD (e.g., MVPD server 102), authorization provider (e.g., authorization server 104), and an HTML5 user agent (e.g., browser installed on subscriber device 110).

When implemented, process 300 may execute the following steps, which are not necessarily required to be in the order listed, except where so clearly designated as being dependent on a prior step. In step S302, the MVPD HTML5 application generates an appropriate URL to access MVPD linear content (e.g., by channel number) or VoD content (e.g., by program name) from the MVPD. In the exemplary embodiment, the MVPD has a well-known registration page URL that is utilized in step S302, which may be utilized by the UI up subscriber device 110 in its installation process, where a subscriber will typically identify the particular MVPD. In some embodiments, an MVPD registration page includes both the authentication of the HTML5 UA (e.g., on subscriber device 110) and the authentication of the subscriber, as well as management of the number of registered devices 110 for the subscriber.

In step S304, the MVPD instructs the MVPD HTML5 application to open a new browser window (or HTML5 UA context) on the UI of subscriber device 110 utilizing the appropriate URL (e.g., MVPD UI page). In the exemplary embodiment, the MVPD HTML5 application verifies that the UI is executing the new browser window as a top level window (window.top != window.self), and presents an error page if verified. In at least one embodiment, the MVPD instructions include authentication JavaScript. If, for example, the HTML5 UA has not yet been authenticated (e.g., according to process 200, described above), the MVPD instructions further include a response with the registration page of the MVPD.

When the MVPD registration page is received by the UA, an Inline Frame (IFrame) 306 loads a second authentication page from the authentication provider (e.g., authentication server 104, FIG. 1), and steps S308, S310, and S312 are then performed within the context of Iframe 306. The context of Iframe 306 operates to authenticate that the lightweight license has been executed.

In step S308, the Web Crypto Key Discovery API this utilized (e.g., by JavaScript) to discover on the UA the "<MVPD>-Auth" key pair associated with the authentication provider domain, and communicate the key pair to the authorization provider. In step S310, the authorization provider uses the Web Crypto API (e.g., also with JavaScript) to sign a token with the private key of the discovered key pair, and then transmit the signed token to the UA. In step S312, the signed token is sent from the UA to the MVPD, and the MVPD uses the "<MVPD>-Auth" public key to verify the signed token. In some embodiments, where the UA does not have an "<MVPD>-Auth" key pair, or the signed token is not verified as valid (e.g., the certificate has been revoked), the MVPD registration page can display an error message on the UI.

In step S314, the UA transmits a request (e.g., an http request) to the MVPD for a UI page. When the subscriber is authenticated by the MVPD, as described above, the MVPD responds, in step S316, with the UI page that sets an authentication cookie on subscriber device 110, which may then begin to access the referenced content.

According to this advantageous process, an MVPD a more efficiently and assuredly be able to deny service to third party devices that have violated the lightweight license. In an exemplary embodiment of process 300, the generated certificate may be utilized to advantageously deny service to all devices and HTML5 UAs from the violating third party. In an alternative embodiment, service may be denied more narrowly to a specific device, or particular version of the HTML5 UA (SKU). Such narrower denial of service may be accomplished by (i) requiring the third party to obtain a new public/private key pair for each SKU (e.g., requiring the third party to re-execute the lightweight license subprocess to obtain a new public/private key pair), or (ii) requiring the third party to provide an identifier that is unique for each SKU (e.g., such as through the UA string as an extension field (SKU=<SKU_specific_string>), which may require the MVPD validation subprocess to include verifying the UA string to determine if it should be denied service).

OAuth Approach

In a typical OAuth2 framework, a Client is required to register with the authorization server, where the resultant license agreement will take effect. After registration, the Client is assigned a ClientID, which is both unique and public, but also a ClientSecret that the Client is supposed to keep secret. As part of the registration, the Client is also required to provide a client redirect URI where unauthorized and unauthenticated access from the Client's applications will be redirected.

TABLE 1 illustrates an exemplary correspondence of OAuth2 roles with a respective entity of the present embodiments relevant to the FCC Downloadable Security Technology Advisory Committee (DSTAC) standards.

TABLE 1

| OAuth2 Roles | DSTAC Entity |
| --- | --- |
| Resource | MVPD deep link |
| Resource owner | MVPD |
| Client | Third party application and server |
| Authorization server | MVPD authenticating portion or representative agent |
| Resource server | MVPD server |

Figure 4:
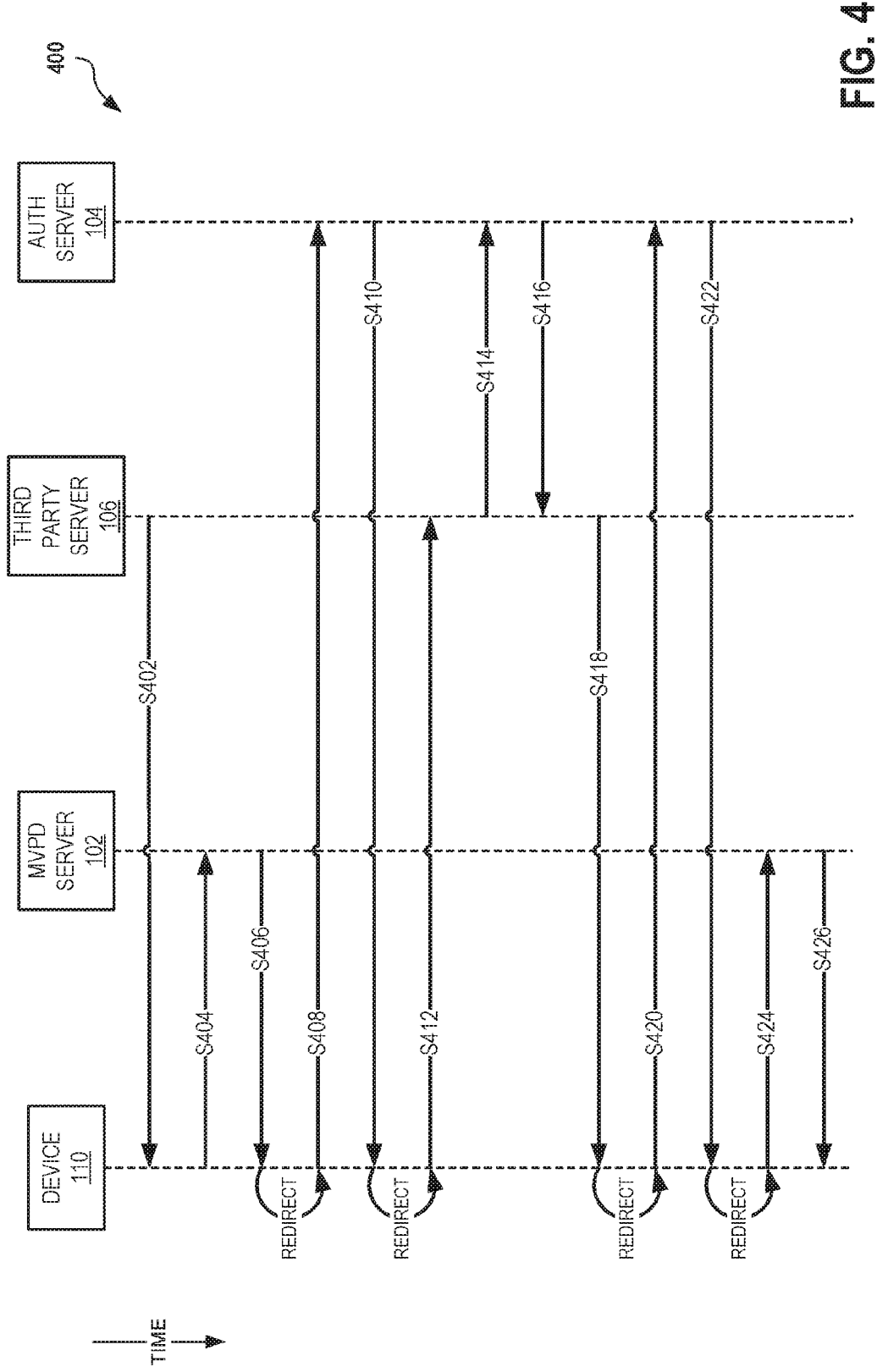
FIG. 4 is a sequence diagram for an exemplary linear content process that may be implemented utilizing open authorization, according to an embodiment.

FIG. 4 is a sequence diagram for an exemplary linear content process 400 which may be implemented utilizing open authorization, according to an embodiment. In the exemplary embodiment, process 400 is implemented utilizing one or more of the elements of system 100, FIG. 1, described above. That is, process 400 is implemented with respect to MVPD server 102, authorization server 104, third party server 106, and subscriber device 110.

When implemented, process 400 may execute the following steps, which are not necessarily required to be in the order listed, except where so clearly designated as being dependent on a prior step. In step S402, the third party server 106 (Client) servers (e.g., invokes, connects with, and/or runs) its third party application, which contains the ClientID, to/on subscriber device 110. In an exemplary embodiment, the third party application is configured to contain or discover MVPD deep links. In step S404, the user activates the deep link (e.g., by clicking on a link on the UI), which functions to request access to the corresponding selected content from MVPD server 102.

Upon receiving an unauthorized request, in step S406, MVPD server redirects device 110 to contact authorization server 104 in step S408 with the unauthorized request, upon which authorization server 104 will look up the ClientID in the redirected request. In step S410, authorization server 104 redirects the MVPD HTML5 application of subscriber device 110 to, in step S412, access the third party client redirect URI of third party server 106.

In step S414, third party server 106 transmits a direct request to authorization server 104, with the ClientID and the ClientSecret, for an authorization grant. In step S416, authorization server 104 returns an authorization grant to third party server 106 based on the ClientSecret. In step S418, third party server 106 redirects the MVPD HTML5 application of subscriber device 110 to, in step S420, back to authorization server 104. In step S422, upon receiving the authorization grant, authorization server 104 exchanges the authorization grant for an access token that is then transmitted to subscriber device 110. In step S424, the MVPD HTML5 application of device 110 is redirected back to the original deep link at MVPD server 102. In step S426, MVPD 102 validates the access token and returns a page to subscriber device 110 that sets a session cookie that allows subsequent requests from the Client to succeed for the cookie duration.

In the exemplary embodiment described above, an optimized standard OAuth2 authorization flow as described for purposes of illustration. That is, the third party server requests the authorization grant, and the authorization server returns an access token in response to a grant request. A person of ordinary skill in the art, after reading and comprehending the present disclosure, will understand that other authorization flows are possible, and within the scope of the deep link embodiments described herein.

Figure 5:
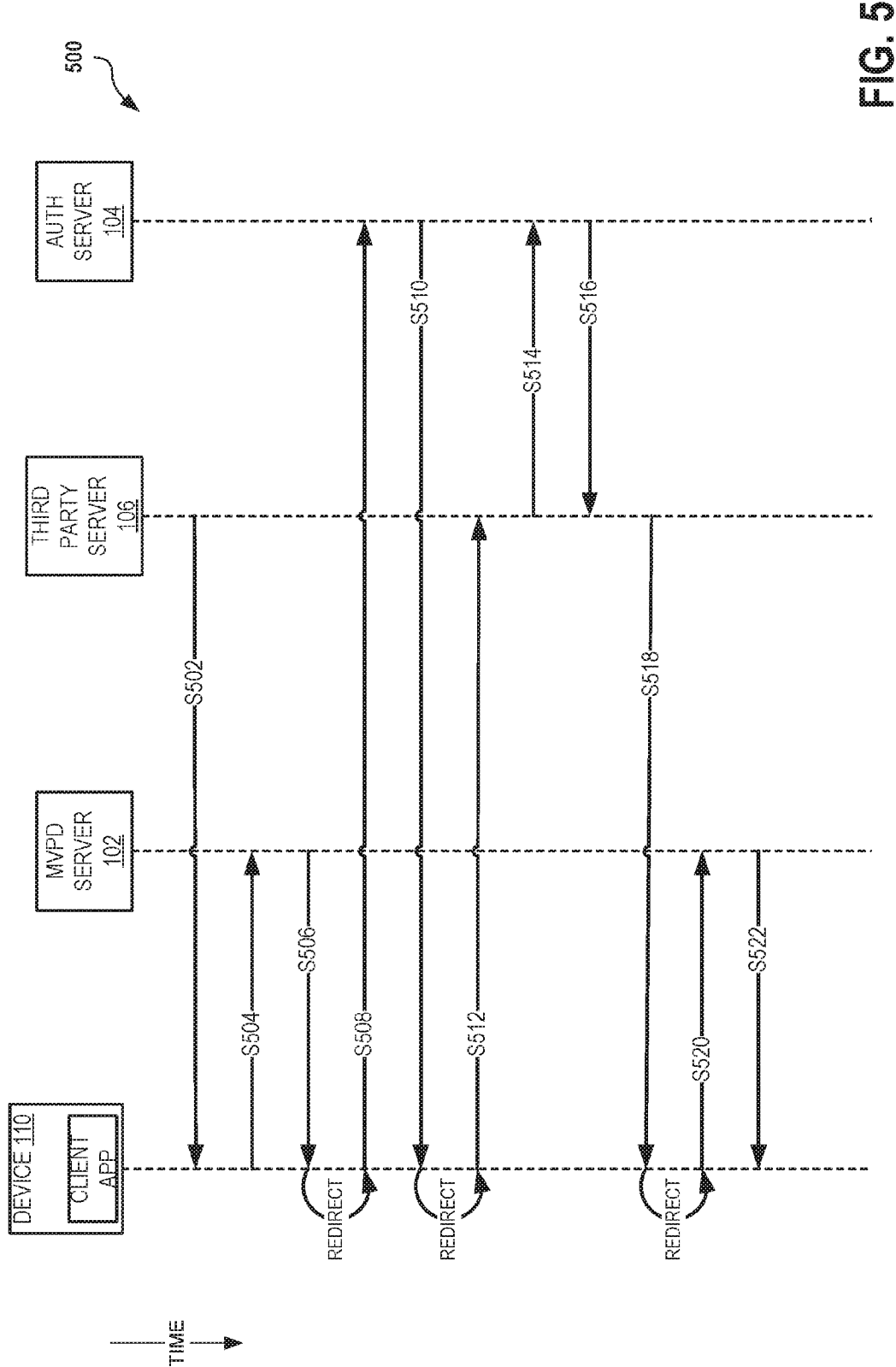
FIG. 5 is a sequence diagram for an alternative linear content process that may be implemented utilizing open authorization, according to an embodiment.

FIG. 5 is a sequence diagram for an alternative linear content process 500 which may be implemented utilizing open authorization, according to an embodiment. Process 500 is similar to process 400, in that process 500 is also implemented utilizing elements of system 100 (FIG. 1) such as MVPD server 102, authorization server 104, third party server 106, and subscriber device 110.

When implemented, process 500 may execute the following steps, which are not necessarily required to be in the order listed, except where so clearly designated as being dependent on a prior step. In step S502, the third party server 106 (Client) servers its third party application, which contains the ClientID, to subscriber device 110. In an exemplary embodiment, the third party application is configured to contain or discover MVPD deep links. In step S504, the user activates the deep link (e.g., by clicking on a link on the UI), which functions to request access to the corresponding selected content from MVPD server 102.

Upon receiving an unauthorized request, in step S506, MVPD server redirects device 110 to contact authorization server 104 in step S508 with the unauthorized request, upon which authorization server 104 will look up the ClientID in the redirected request. In step S510, authorization server 104 redirects the MVPD HTML5 application of subscriber device 110 to, in step S512, access the third party client redirect URI of third party server 106.

In step S514, third party server 106 transmits a direct request to authorization server 104, with the ClientID and the ClientSecret, for an authorization grant. In step S516, authorization server 104 returns an authorization token to third party server 106. In step S518, third party server 106 redirects the MVPD HTML5 application of subscriber device 110 to, in step S520, back to the original deep link at MVPD server 102. In step S522, MVPD 102 validates the access token and returns a page to subscriber device 110 that sets a session cookie that allows subsequent requests from the Client to succeed for the cookie duration.

Process 500 is therefore similar to process 400, except that a user, and process 500, accesses an MVPD page which can detect whether a subscriber authentication cookie exists and initiate the appropriate process if there is no cookie. As described above, process 500 (as well as process 400) may further include authorization flow steps to specify the terms of the license agreement (e.g., a top level window, etc.), and how the MVPD application may be further configured to detect in real time whether particular terms of the license are being met.

The MVPD HTML5 application of the embodiments described herein is therefore fully capable of implementing additional loading controls that are available in the HTML5 standard. The exemplary embodiment, these additional loading controls are utilized when the MVPD HTML5 application is being linked to from within a third party application. In the exemplary embodiment, the MVPD HTML5 application is configured such that the MVPD HTML5 application necessarily executes as the topmost browser window that is compliant with MVPD requirements (e.g., opening the URL in a new tab/window or HTML5 UA context). Alternatively or additionally, the MVPD HTML5 application may be configured such that the MVPD HTML5 application window will be full screen by default.

In some embodiments, the MVPD HTML5 application described herein is further configured to implement additional capabilities, available to HTML5 UAs, that are of significant relevance to the environment of the embodiments described above, including, without limitation: Iframe Execution; Iframe Detection; Top Window Visibility; Iframe Location; Iframe Visibility; Full Screen Detection; and Going Full Screen.

The Iframe Execution capability may, for example, utilize 'x-frame-options' as an HTTP response header, which indicates whether a browser should be allowed to render a page in a <frame>, <iframe> or <object>. Options for the browser include: DENY, in which a page cannot be loaded in one of the objects; SAMEORIGIN, in which a page is only loaded in one of the objects if the parent has the same origin; and ALLOW-FROM, in which a page is only loaded in one of these objects if the parent has the specified origin.

The Iframe Detection capability may, for example, utilize 'window.frameElement' as the frame element if the window is in an Iframe (e.g., 'window.top' != 'window.self'), and 'null' for all other windows. The Top Window Visibility capability may, for example utilize 'document.visibilityState' as a return indicating whether the top level window is "hidden" (totally) or "visible" (partially). In this example, a window in hidden tab would return a "hidden" value. An Iframe in a window though, returns the outer most window visibility state, and thus is not used for assessing Iframe visibility.

The Iframe Location capability may, for example, utilize a 'window.parent.document.getElementsByTagName('iframe')' instruction in the case where an Iframe returns an array of Iframes in the parent window. By comparing the 'name' property for each Iframe in the array to 'self.name', an Iframe can determine which particular Iframe in the array is the selected Iframe. The Iframe will typically include a 'getBoundingClientRect( )' property which returns the coordinates of the four corners of that Iframe. The Iframe Visibility capability may be implemented according to the other capabilities described above, or may include further heuristics in its implementation.

The Full Screen Detection capability may, for example, utilize 'screen.width' and 'screen.height' in order to return the size of the physical display, and 'window.innerWidth' and 'window.innerHeight' in order to return the size of the window display area, minus scroll bars. These particular returns may be further utilized to detect the size of the MVPD application display area, including if the display area occupies the entire screen of the associated device display. The Going Full Screen capability may be configured within the MVPD HTML5 application itself, or alternatively utilize a mechanism present within most browsers for windows or Iframes to go full screen.

Exemplary embodiments of systems and methods for content management and control of linear and VoD content are described above in detail. The advantageous embodiments described above realize significant advantages over conventional systems that utilize HTML5 specifications to access linear content. According to the present systems and methods, superior integrated search capability is available to the user across platforms and devices for the same linear content, but without allowing unauthorized third parties to alter or interrupt the content viewing by the user. The user experiences a seamless access across many Internet-configured devices owned by the subscriber, and without interference by the manufacturers of the various subscriber devices, or by other applications installed on a particular device.

The systems and methods of this disclosure are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for authenticating and authorizing at least one user agent to access content selected through an MVPD HTML5 application of a multichannel video programming distributor, the method comprising the steps of:
    verifying that the MVPD HTML5 application is accessing the selected content on behalf of a registered subscriber of the multichannel video programming distributor;
    deep linking to the MVPD HTML5 application by selecting a unique URL within a user interface of an electronic device in which the MVPD HTML5 application is stored;
    authorizing the registered subscriber based on the particular entitlements of the registered subscriber with the multichannel video programming distributor;
    executing a first lightweight license between the at least one user agent and the multichannel video programming distributor;
    validating the licensor as a legitimate business entity;
    downloading a certificate attesting that the first lightweight license has been executed, the certificate including at least a public key and a private key pair; and
    installing the private key from the public key and private key pair on the electronic device.

2. The method of claim 1, further comprising the step of authenticating that the at least one user agent is a compliant implementation, and is from a first entity that has executed a second lightweight license.

3. The method of claim 2, further comprising the step of determining that the user interface of the electronic device is authorized from a second entity having executed a third lightweight license.

4. The method of claim 3, wherein the first and second entities are the same entity.

5. The method of claim 3, wherein the first, second, and third lightweight licenses represent the same lightweight license being executed by different respective pairs of parties.

6. The method of claim 1, when the step of authorizing the registered subscriber further comprises a substep of issuing a security certificate to at least one of the electronic device and the MVPD HTML5 application.

7. The method of claim 6, further comprising a substep of revoking the security certificate upon termination of the particular entitlements of the registered subscriber.

8. The method of claim 1, wherein the lightweight license is executed (i) with the multichannel video programming distributor individually, or (ii) through an industry-wide license to which the multichannel video programming distributor has agreed.

9. A method for accessing content from a multichannel video programming distributor over an electronic network by a user agent, the method comprising the steps of:
    causing an HTML5-based application to be executed on an electronic device of the user agent, the HTML5-based application authorized by the multichannel video programming distributor;
    generating, from the HTML5-based application, a first URL to access the content;

instructing the HTML5-based application to open at least one of a browser window and a user agent context on a user interface of the electronic device;

loading an inline frame within the at least one of the browser window and the user agent context;

discovering a web crypto key pair of the user agent;

obtaining a signed token from an authorization provider using a private key of the discovered key pair;

verifying the signed token using a public key of the discovered key pair;

requesting a user interface page from the multichannel video programming distributor; and transmitting a user interface page that sets an authentication cookie on the electronic device.

10. The method of claim 9, wherein the steps of discovering, obtaining, and verifying are performed within the context of the inline frame.

11. The method of claim 9, further comprising the step of denying service to the electronic device of the user agent based on at least one of a revoked security certificate and the signed token being verified as invalid.

12. The method of claim 11, further comprising the substep of denying service to one or more additional electronic devices of the user agent.

13. A system for managing content distributed over an electronic network, the content selectable through a multichannel video programming distributor (MVPD) HTML5 application, the system including a server device configured to:

verify that the MVPD HTML5 application is accessing selected content on behalf of a registered subscriber of the MVPD;

deep link to the MVPD HTML5 application by selecting a unique URL within a user interface of an electronic device in which the MVPD HTML5 application is stored;

authorize the registered subscriber based on the particular entitlements of the registered subscriber with the MVPD;

execute a first lightweight license between the at least one user agent and the MVPD;

validate the licensor as a legitimate business entity;

download a certificate attesting that the first lightweight license has been executed, the certificate including at least a public key and a private key pair; and install the private key from the public key and private key pair on the electronic device.

14. The system of claim 13, wherein the server device is further configured to authenticate that the at least one user agent is a compliant implementation and from a first entity that has executed a second lightweight license.

15. The system of claim 14, wherein the server device is further configured to determine that the user interface of the electronic device is authorized from a second entity having executed a third lightweight license.

16. The system of claim 15, wherein the first and second entities are the same entity.

17. The system of claim 15, wherein the first, second, and third lightweight licenses represent the same lightweight license being executed by different respective pairs of parties.

18. The system of claim 13, wherein the server device is further configured to issue a security certificate to at least one of the electronic device and the MVPD HTML5 application.

19. The system of claim 18, wherein the server device is further configured to revoke the security certificate upon termination of the particular entitlements of the registered subscriber.

20. The system of claim 18, wherein the server device is further configured to execute the lightweight license with the MVPD individually, or through an industry-wide license to which the MVPD has agreed.

21. A system for enabling access, by a user agent, of content from a multichannel video programming distributor (MVPD) over an electronic network, the system comprising a server device configured to:

cause an HTML5-based application to be executed on an electronic device of the user agent, the HTML5-based application being authorized by the MVPD;

generate, from the HTML5-based application, a first URL to access the content;

instruct the HTML5-based application to open at least one of a browser window and a user agent context on a user interface of the electronic device;

load an inline frame within the at least one of the browser window and the user agent context;

discover a web crypto key pair of the user agent;

obtain a signed token from an authorization provider using a private key of the discovered key pair;

verily the signed token using a public key of the discovered key pair;

request a user interface page from the MVPD; and transmit the interface page to the electronic device, wherein the transmitted interface page sets an authentication cookie on the electronic device.

22. The system of claim 21, wherein the server device is further configured to perform the discovery of the web crypto key pair, the obtainment of the signed token, and the verification of the signed token within the context of the inline frame.

23. The system of claim 21, wherein the server device is further configured to deny service to the electronic device of the user agent based on at least one of a revoked security certificate and the signed token being verified as invalid.

24. The system of claim 23, wherein the server device is further configured to deny service to one or more additional electronic devices of the user agent.

* * * * *